United States Patent
Cassidy et al.

(10) Patent No.: US 9,179,181 B2
(45) Date of Patent: *Nov. 3, 2015

(54) HOSPITALITY MEDIA SYSTEM THAT AVOIDS NETWORK CONGESTION AND SERVER LOAD WHILE PROVIDING MEDIA EXPERIENCE WITHIN GUEST ROOM, AND COMPUTER SERVER AND METHOD THEREOF

(71) Applicant: Guest Tek Interactive Entertainment Ltd., Calgary (CA)

(72) Inventors: Brendan G. Cassidy, Calgary (CA); Gary R. Court, Calgary (CA)

(73) Assignee: GUEST TEK INTERACTIVE ENTERTAINMENT LTD., Calgary (CA)

( * ) Notice: Subject to any disclaimer, the term of this patent is extended or adjusted under 35 U.S.C. 154(b) by 294 days.

This patent is subject to a terminal disclaimer.

(21) Appl. No.: 13/679,691

(22) Filed: Nov. 16, 2012

(65) Prior Publication Data

US 2013/0081093 A1 Mar. 28, 2013

Related U.S. Application Data

(63) Continuation of application No. 12/846,991, filed on Jul. 30, 2010, now Pat. No. 8,335,847.

(51) Int. Cl.
| | |
|---|---|
| *G06F 15/173* | (2006.01) |
| *H04N 21/436* | (2011.01) |
| *G06F 9/50* | (2006.01) |
| *H04L 29/08* | (2006.01) |

(52) U.S. Cl.
CPC .......... *H04N 21/43615* (2013.01); *G06F 9/505* (2013.01); *H04L 67/32* (2013.01)

(58) Field of Classification Search
None
See application file for complete search history.

(56) References Cited

U.S. PATENT DOCUMENTS

| | | | |
|---|---|---|---|
| 7,171,678 B2 * | 1/2007 | Buehl et al. ..................... | 725/87 |
| 7,590,122 B2 | 9/2009 | Constantinof | |
| 7,945,813 B1 | 5/2011 | Watson et al. | |
| 8,086,741 B2 | 12/2011 | Markaryan et al. | |
| 8,239,566 B2 * | 8/2012 | Fromm et al. ................ | 709/235 |
| 2007/0033612 A1 * | 2/2007 | Lerman et al. .................. | 725/39 |
| 2008/0285496 A1 * | 11/2008 | Fuchs et al. ................... | 370/311 |
| 2009/0025027 A1 | 1/2009 | Craner | |
| 2012/0030326 A1 | 2/2012 | Cassidy et al. | |

OTHER PUBLICATIONS

The Internet Society, "RFC-2616 Hypertext Transfer Protocol—HTTP/1.1", Jun. 1999, p. 70 and 141.

* cited by examiner

*Primary Examiner* — John B Walsh
(74) *Attorney, Agent, or Firm* — ATMAC Patent Services Ltd.; Andrew T. MacMillan (57) ABSTRACT

A method of servicing requests for information at a server includes receiving a request for information from a client device, and determining a number of attempts of the request made by the client device. Both the client device and the server may count the number of attempts for each request. When the number of attempts is greater than a threshold, the method includes servicing the request and sending the information to the client device. When the number of attempts is not greater than the threshold, the method includes sending a service unavailable message to the client device. A retry-after delay may be calculated by the server according to a predicted time for the server to exit an overloaded state and included in the service unavailable message. The predicted time may take into account both requests currently being serviced and requests that have been scheduled to be serviced in the future.

20 Claims, 7 Drawing Sheets

FIG. 1

| Request from client device \ Server | Not overloaded | Overloaded |
|---|---|---|
| Attempts ≤ Threshold | 200<br>Accept connection and service request | 202<br>Predict delay, then refuse connection with retry-after instruction according to predicted delay |
| Attempts > Threshold | 204<br>Accept connection and service request | 206<br>Hold connection open and service request as soon as possible |

| Time point | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| STB 1 network communication | | Request (attempt 1) | | | Request (attempt 1) | | | | | | Request (attempt 2) | | | |
| STB 2 network communication | | Request (attempt 1) | | | Request (attempt 2) | | | | | | | | | |
| STB 3 network communication | | | Request (attempt 1) | | | | | Request (attempt 2) | | | | | | |
| Controller network communication | | STB 2 Service unavailable (retry delay 3) | STB 3 Service unavailable (retry delay 5) | STB 1 Information | STB 1 Service unavailable (retry delay 6) | | STB 2 Information | | | STB 3 Information | | | STB 1 Information | |
| Servicing | | | STB 1 Request | | | STB 2 Request | | | STB 3 Request | | | STB 1 Request | | |
| Overloaded state | No | | | | | | | Yes | | | | | | No |
| Threshold | 0 | | | | | | | 1 | | | | | | 0 |
| Pending requests | 0 | 2 | 3 | 2 | 3 | 3 | 2 | 2 | 2 | 1 | 1 | 1 | 0 | 0 |
| Predicted time delay | 0 | 5 | 7 | 6 | 8 | 7 | 6 | 5 | 4 | 3 | 2 | 1 | 0 | 0 |

FIG. 4

| Time point | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| STB 1 network communication | | Request (attempt 1) | | | Request (attempt 1) | | | | | | Request (attempt 2) | | | |
| STB 2 network communication | | Request (attempt 1) | | | Request (attempt 2) | | | | | | | | | |
| STB 3 network communication | | | Request (attempt 2) | | | | | | | | | | | |
| Controller network communication | | STB 2 Service unavailable (retry delay 3) | | STB 1 Information | STB 1 Service unavailable (retry delay 6) | | STB 3 Information | | | STB 2 Information | | | STB 1 Information | |
| Servicing | | | STB 1 Request | | | STB 3 Request | | | STB 2 Request | | | STB 1 Request | | |
| Overloaded state | No | | | | | | | Yes | | | | | | No |
| Threshold | 0 | | | | | | | 1 | | | | | | 0 |
| Pending requests | 0 | 2 | 3 | 2 | 3 | 3 | 2 | 2 | 2 | 1 | 1 | 1 | 0 | 0 |
| Predicted time delay | 0 | 5 | 7 | 6 | 8 | 7 | 6 | 5 | 4 | 3 | 2 | 1 | 9 | 0 |

HOSPITALITY MEDIA SYSTEM THAT AVOIDS NETWORK CONGESTION AND SERVER LOAD WHILE PROVIDING MEDIA EXPERIENCE WITHIN GUEST ROOM, AND COMPUTER SERVER AND METHOD THEREOF

CROSS-REFERENCE TO RELATED APPLICATIONS

This application is a continuation of U.S. patent application Ser. No. 12/846,991 filed Jul. 30, 2010, which is incorporated herein by reference.

BACKGROUND OF THE INVENTION

The invention pertains generally to computer servers. More specifically, the invention relates to managing network congestion and server load in a system having a plurality of client devices such as a hospitality media system.

In a typical hotel media system, set-top boxes (STBs) are installed in guest rooms and are in communication with a central server. The communication is usually performed over an Internet protocol (IP) network available in the hotel, and part of a boot-up process at each STB typically involves requesting configuration information from the server. A problem with such a configuration is that the central server may become overloaded with simultaneous requests from many STBs. One example of a particularly problematic event is when power is restored in the hotel after an unexpected outage. In this situation, STBs in each room will boot-up at approximately the same time, and, when the hotel includes hundreds or even thousands of STBs, the resulting sudden surge in network requests and server load can be overwhelming. The entire system may be exponentially delayed as a result.

A common solution to this problem is to introduce a random delay at each STB before attempting to request information from the server. Random delays tend to spread out the requests from STBs and allow the server more time to process each request. In the event that the server still becomes overloaded and unable to service all the requests, affected STBs may wait another random delay as a back-off delay before attempting the request again. The back-off delays may exponentially increase in duration to further spread out the requests and allow the server more time to recover.

Although this solution works well in a system with a relatively small number of STBs, it does not scale to hotels having thousands of STBs. One reason is that the random numbers generated by the STBs may not actually be random and therefore a large number of STBs may "randomly" chose exactly the same delay. Even with true random delays, there is still a chance that hundreds of STBs will all choose the same (or similar) random numbers. When this happens, the server unfortunately remains overloaded and will need to reject some requests. These rejected requests will be further spread out by increasing the upper-bound on the back-off time delay at each STB. In a large hotel, the upper-bound of the random delay needs to quickly grow in order to sufficiently space out the requests in the event that all STBs are requesting data at the same time. Minutes of back-off delay may be encountered in the event that thousands of STBs are all rebooting at the same time. However, in the event that there is actually no long-term server load, it is very undesirable to have exponentially increasing delays. For example, when only a single STB is rebooted but then happens to be unlucky on its first few attempts at requesting configuration data from the server, the STB may randomly choose a very long back-off delay. In the event that the server was only momentarily busy, the long back-off delay at the single STB is unnecessary and a waste of user's time.

SUMMARY OF THE INVENTION

According to an exemplary embodiment of the invention, a hospitality media system is disclosed. The hospitality media system includes a media system server coupled to a computer network, and a set-top box coupled to the computer network. The set-top box is for providing a media experience in a guest room of a hospitality establishment. The set-top box establishes a connection with the media system server over the computer network and sends a request for information to the media system server via the connection. The requested information is to be utilized by the set-top box when providing the media experience. In response to receiving the request at least when the media system server is in a particular operating state, the media system server determines a number of attempts of the request that have been made by the set-top box. When the number of attempts is greater than a threshold, the media system server holds the connection in an open state while servicing the request and provides the set-top box with the requested information via the connection. When the number of attempts is not greater than the threshold, the media system server sends a service unavailable response to the set-top box via the connection and then closes the connection.

According to another exemplary embodiment of the invention, a computer server is disclosed. The computer server includes a communication module coupled to a computer network for establishing a connection over the computer network with a set-top box in a guest room of a hospitality establishment, and a processor coupled to the communication module. The processor is configured to receive a request for information from the set-top via the connection, the requested information to be utilized by the set-top box to provide a media experience in the guest room. The processor is further configured to determine an operating state of the computer server, and when the computer server is in at least a particular operating state, the processor is configured to determine a number of attempts of the request that have been made by the set-top box. When the number of attempts is greater than a threshold, the processor is configured to hold the connection in an open state while servicing the request and provide the set-top box with the requested information via the connection. When the number of attempts is not greater than the threshold, the processor is configured to send a service unavailable response to the set-top box via the connection and then close the connection.

According to another exemplary embodiment of the invention, a method of providing a media experience within a guest room of a hospitality establishment is disclosed. The method includes configuring a set-top box in the guest room to establish a connection with a media system server via a computer network and to send a request for information to the media system server via the connection, the requested information to be utilized by the set-top box when providing the media experience. The method further includes configuring the media system server when operating in at least one state to determine a number of attempts of the request that have been made by the set-top box; and, when the number of attempts is greater than a threshold, to hold the connection in an open state while servicing the request and provide the set-top box with the requested information via the connection; and, when the number of attempts is not greater than the threshold, to send a service unavailable response to the set-top box via the connection and then close the connection.

DETAILED DESCRIPTION

Figure 1:
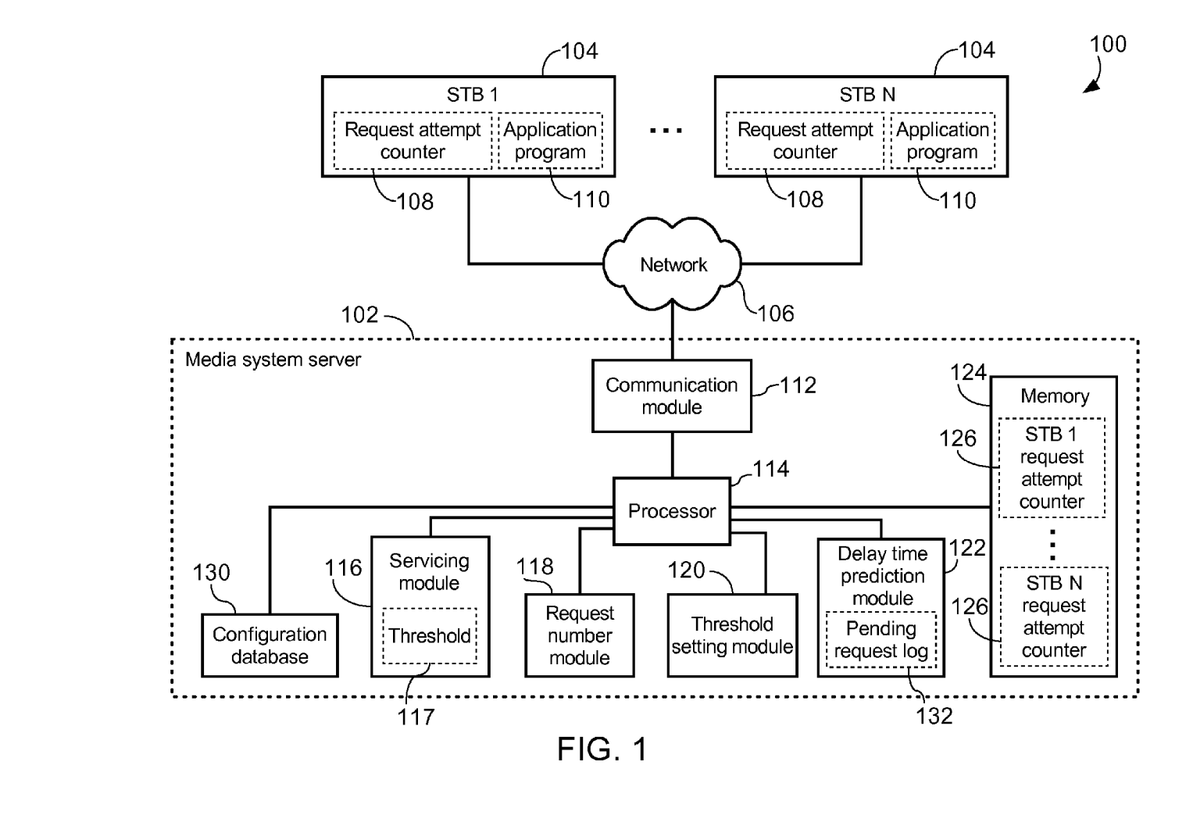
FIG. 1 is a block diagram of a hotel media system including a media system server and a plurality of client devices according to one configuration of the present invention.

FIG. 1 is a block diagram of a hotel media system 100 including a media system server 102 and a plurality of client devices 104 according to one configuration of the present invention. For illustration purposes, the client devices 104 are shown as set-top boxes (STBs); however, the present invention is equally applicable to other types of client devices. The STBs 104 are coupled to the server 102 through a network 106, which could be a wired or wireless Internet protocol (IP) network installed at the hotel property or could be an external network such as the Internet. In one configuration, the server 102 includes a communication module 112, a servicing module 116, a request number module 118, a threshold setting module 120, a delay time prediction module 122, a memory device 124, a configuration database 130, and a processor 114. Although, the modules 112, 116, 118, 120, 122 are shown in FIG. 1 as a dedicated hardware modules, they may also be implemented in other configurations as software program(s) that are executed by a general or specific purpose processor 114 and that causes the processor 114 to operate pursuant to the software program(s) to perform the functions described below.

At boot-up, each STB 104 executes a stored application program 110 that causes a request for configuration information from the server 102. In another configuration, the requested configuration information may be the application program 110 (or a significant portion of the application program 110) itself. This could be the case where that STBs 104 run a built-in web browser upon boot-up and then download, from the server 102, a custom application program 110 that is thereafter executed within the web browser environment on the STB 104. The server 102 services each request for configuration information by searching for the requested information in the configuration database 130 and then sending the requested information to the requesting STB 104. The information requests by the STBs may be dynamic in nature such that different information is sent from the server 102 to different STBs 104. Retrieving the desired information for each STB 104 in the database 130 may incur significant delays while the database 130 searches for and then formats the requested information. Caching data retrieved from the database 130 may somewhat speed the servicing times; however, there will inevitably be a load on the server 102 for a period of time due to each request.

Depending on certain factors, the server 102 may determine itself to be in an overloaded state. One factor that may be utilized to determine whether or not the server 102 is overloaded includes monitoring how many simultaneous connections at the server 102 are currently open with STBs 104. For example, a typical transport control protocol (TCP)/IP based media system server 102 may only be able to support a predetermined maximum number of open TCP connection (e.g., one thousand open TCP connections) and will be unable to open any additional network connections once the limit is reached. Therefore, the server 102 may monitor how many connections are currently open and define its operating state to be overloaded when the number of currently open connections is greater than a percentage such as ninety percent of the maximum allowable connections, for example. Another factor that could be utilized to determine whether or not the server 102 is overloaded, either in combination with open connections or separately, includes monitoring an average delay-time per request. The server 102 may continuously calculate an average time delay between receiving requests from STBs 104 and providing the requested information to the STBs 104. When the average time becomes greater than a threshold 117 such as ten seconds, for example, the server 102 may define its operating state to have become overloaded. Other combinations of factors may also be utilized to determine when the server 102 has become overloaded including, but not limited to, processor 114 usage, communication module 112 network usage, database 130 usage, etc.

When operating in an overloaded state, in one configuration, unless the requesting STB 104 has already reached a maximum number of acceptable request attempts, the server 102 refuses to service newly received requests from the STB 104. By rejecting newly received requests, very little additional load is placed on the server 102. For example, the server 102 may refuse the connection with a service unavailable response code such as hypertext transfer protocol (HTTP) response code503 Service Unavailable as defined by RFC 2616, page 70. However, by continuing to service requests that have already been attempted more than the maximum number of acceptable times, a minimum service quality is preserved. For example, in one configuration, when receiving a request from a STB 104, the request number module 118 determines a number of attempts of the request made by the STB 104, and, when overloaded, the servicing module 116 only services the request when the number of attempts is greater than a threshold 117 that represents a maximum number of acceptable attempts. As will be explained, the threshold 117 may be predetermined or dynamic.

To allow the request number module 118 to determine the number of attempts, each STB 104 may include a request attempt counter 108 for counting request attempts. When making a request, the current number of attempts is included in the request. For example, upon a first attempt of a request, the counter would indicate a value of "1". If the request was retried, for example due to the first attempt being refused or not received by the server 102, the counter would be incremented and would indicate a value of "2" since this is the second attempt. The same counter action would continue for each subsequent request until the request is finally serviced by the server 102 and the counter 108 would then be reset back to a value of "1" for the first attempt of a new request. For an HTTP based request, the STB 104 may include the number of attempts within the request in a custom header such as "X-attempts". The request number module 118 then determines the number of attempts of the request by examining the headers of the request to read the current number of attempts as specified within the "X-attempts" header. For non-HTTP based requests, a similar field may be created in a header or data section of the request packet. In this way, the STBs 104 may keep track of the number of attempts for each request, which reduces load on the server 102 by not requiring the server 102 to track the number of attempts per request. This configuration is particularly well-suited to a hotel media system 100 having STBs 104 being provided as a part of the system 100. Because the STBs 104 are only executing authorized application program(s) 110 or firmware that is designed to cooperate with the server 102, there is little concern that a particular STB 104 will "cheat" by inaccurately reporting a higher than accurate number of request attempts in order to receive preferential service from the server 102.

In another configuration, the memory device 124 of the server 102 stores request attempt counters 126 for different STBs 104. The request number module 118 then determines the number of attempts of each request by utilizing the counter 126 corresponding to the requesting STB 104 to count a number of request attempts made by the requesting set-top box 104. Although, this configuration places an additional load on the server 102 to keep track of the number of attempts for each STB 104, one benefit is that fairness is guaranteed because it will be impossible for a rogue STB 104 to report an inaccurate number of attempts to gain preferential treatment from the server 102. This is useful when the present invention is utilized with client devices that cannot be trusted to accurately report the correct number of attempts, or when client devices are provided by or under the control of users or a third-party vendor. For example, in a media system 100 that allows foreign devices to request information from the server 102, the foreign devices may not be configured to include the number of attempts within the header of each request. In this case, the server 102 may track the number of attempts using the counters 126 in the memory device 124.

In another configuration, the server 102 may automatically detect which client devices are including the number of attempts in the request headers, and only track the number of attempts for client devices that are not already operable to do it themselves. This allows the server 102 to utilize the present invention with any kind of client device whether or not the client device natively supports the method of the present invention.

Figure 2:
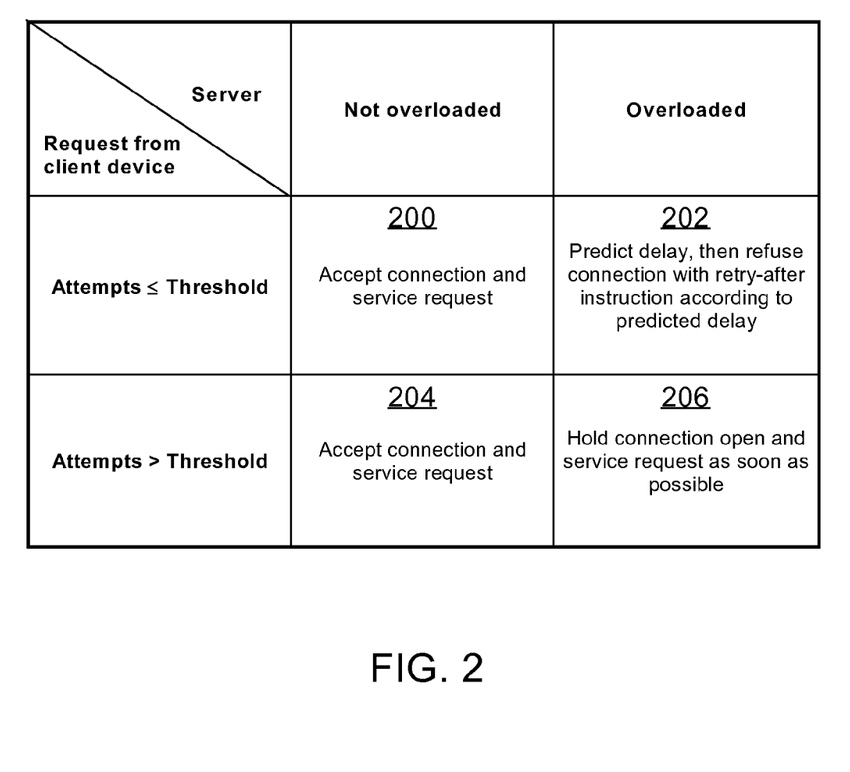
FIG. 2 illustrates a table showing actions taken by the server of FIG. 1 in different situations according to an exemplary configuration of the present invention.

FIG. 2 illustrates a table showing actions 200, 202, 204, 206 taken by the server 102 of FIG. 1 in different situations according to an exemplary configuration of the present invention. As shown in FIG. 2, when the server 102 is not operating in the overloaded state (actions 200, 204), regardless of the number of attempts for each request, the server 102 simply accepts the network connection with the requesting STB 104 and services the request. Although, there may be slight delays due to servicing times and multitasking overhead, because the server 102 is not overloaded, the server 102 generally starts servicing the request immediately.

When the server 102 is overloaded (actions 202, 206), whether or not an incoming request will be serviced is decided by the servicing module 116 according to how many attempts of the request have been made so far. When the number of attempts is greater than a threshold 117 (action 206), this means the requesting STB 104 has already repeated this request more than a maximum acceptable number of times and therefore is given preference by the server 102. For example, the requesting STB 104 may have been delayed due to being repeatedly refused service by the server 102. In order to prevent the same STB 104 from being continuously refused service, once the number of attempts has exceeded the threshold 117, even if overloaded, the server 102 will accept the network connection with the requesting STB 104 and hold the connection open until the server 102 is able to service the request and send the requested information to the STB 104. Because the server 102 is overloaded, there may still be a delay while the server 102 services the request, but a delay with guaranteed service at the end of the delay is better than continuing to refuse service to a STB 104 that has already attempted the request greater than the threshold 117 number of times. Additionally, to speed service, the servicing module 116 may internally change the job order to give priority to a request that has a number of attempts being greater than the threshold 117.

As shown by action 202 in FIG. 2, when the server 102 is overloaded and receives a request having a number of attempts being less than or equal to the threshold 117, the server 102 refuses the connection by sending a service unavailable message. Additionally, in order to prevent a worsening of the overloaded state and to avoid unnecessary network congestion from request retries, the delay time prediction module 122 predicts an amount of time required by the server 102 to exit the overloaded state, and includes this time as a retry-after delay in the service unavailable message. Upon receiving the service unavailable message from the server 102, the requesting STB 104 waits the retry-after delay specified in the service unavailable message before attempting a subsequent retry of the request. When using the HTTP response code 503 Service Unavailable, as specified by RFC 2616, page 70, a retry-after delay field is available for specifying the retry-after delay. However, it should be noted that no guidance is provided by RFC 2616 on how to calculate the retry-after delay. When not using HTTP requests, a custom service unavailable packet may be defined including a similar retry-after delay field.

To calculate the retry-after delay, in one configuration of the present invention, the delay time prediction module 122 includes a pending request log 132 storing a record of pending requests including current requests being serviced and prior requests from other STBs 104 that have not yet been serviced and for which the servicing module 116 previously sent one or more service unavailable messages. The delay time prediction unit 122 predicts the amount of time required to exit the overloaded state by calculating an estimated time required to service these pending requests. In this way, when refusing service, the retry-after delay is used by the server 102 to schedule the subsequent retry to occur when the server 102 will exit the overloaded state. Request retries are thereby scheduled to maximize utilization of the server 102 without further overloading the server 102. By refusing the connections for requests for which the number of attempts is not greater than the threshold 117, and scheduling them to be retried when the server 102 predicts it will no longer be overloaded, the server 102 will not reach its maximum number of possible connections, and will therefore continue to be available for more urgent requests that have a number of attempts already exceeding the threshold 117 (action 206 in FIG. 2). When calculating the retry-after delay, a random time may also be added to or subtracted from the predicted time to exit the overloaded state to account for unknown server 102 events that may occur before the subsequent retry of the request is made.

The threshold 117 may be predetermined or dynamically configured by the threshold setting module 120. In one configuration, the threshold 117 represents a maximum allowable number of attempts per request before the server 102 will always accept the connection and service the request, even when it is overloaded. The threshold 117 may be configured to limit the maximum delay that could be encountered by a very unlucky STB 104 before the server 102 will accept the connection and begin processing the request. For example, if N designates the total number of STBs 104, P designates the number of simultaneous requests that may be serviced by the server 102, S designates a maximum servicing time per request, and T designates the threshold 117 (i.e., the maximum acceptable number of request attempts, after which the server 102 will accept the connection even if it is overloaded), the maximum delay (D) before the server 102 will accept a connection request from a STB 104 can be calculated by the formula:

$$D = (N-1)\frac{TS}{P} \qquad \text{Formula 1}$$

By adjusting the value of the threshold 117 (T), an acceptable maximum delay (D) may be configured. For example, in a system 100 including three thousand STBs 104, where the server 102 can simultaneously handle one thousand TCP connections, and each request could take up to 500 ms to service, a threshold 117 (T) value of "10" attempts would limit the maximum delay (D) to approximately 15 seconds before the server 102 would, even if currently overloaded, accept an eleventh connection attempt from a very unlucky STB 104 and begin servicing the request. The threshold 117 may also be dynamically set by the server 102 when parameters in the above formula change. For example, to maintain an acceptable delay (D) when parameters such as the number of active STBs 104 (i.e., in use by guests) or the number of simultaneous requests that may be serviced by the server 102 change (i.e., due to scheduled maintenance processes using some of the connections), the threshold 117 may be automatically adjusted by the threshold setting module 120.

Figure 3:
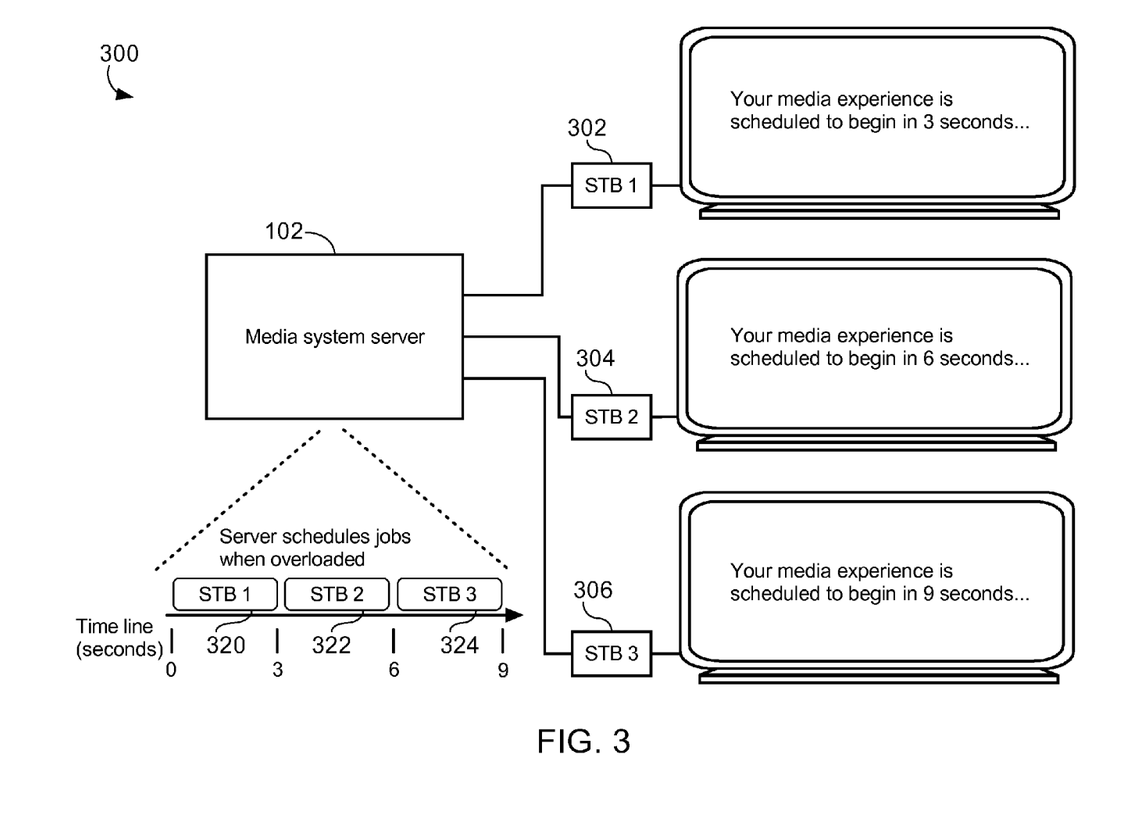
FIG. 3 illustrates a simplified hotel media system having three STBs that have all been rebooted at substantially the same time.
Figure 4:
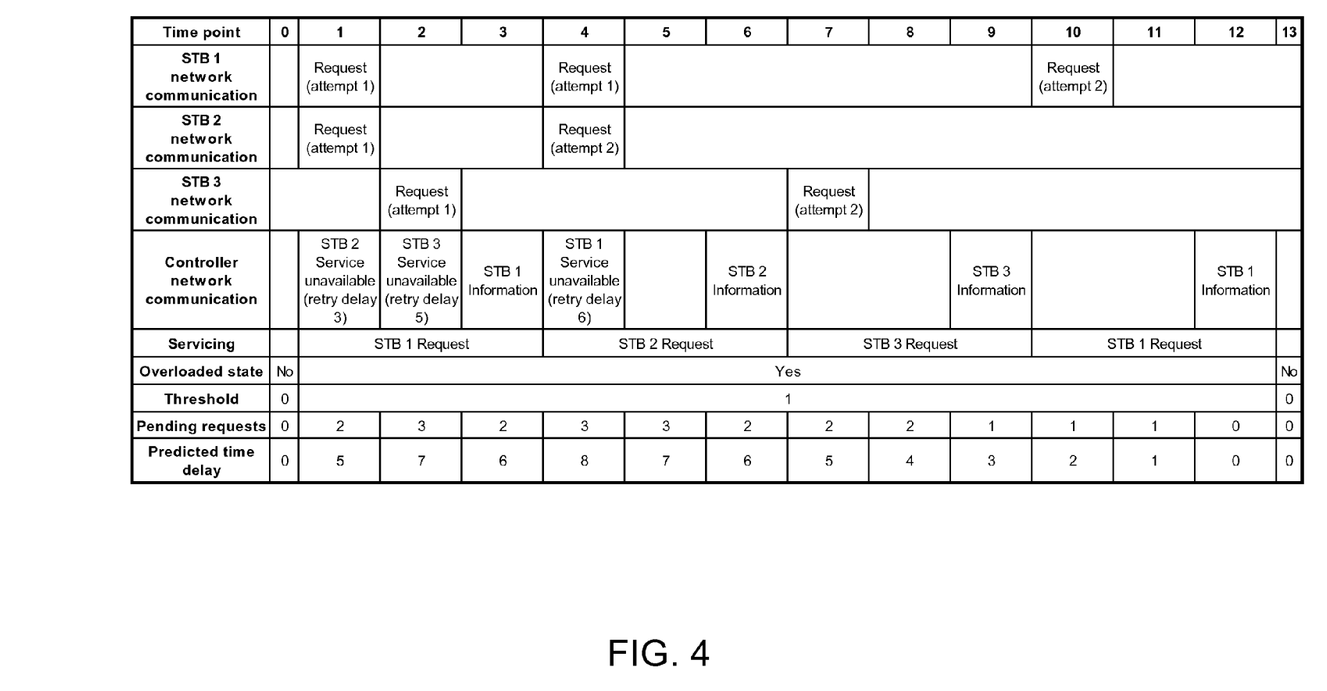
FIG. 4 illustrates a first exemplary timeline diagram for the simplified media system of FIG. 3 where STBs make requests at substantially the same time.
Figure 5:
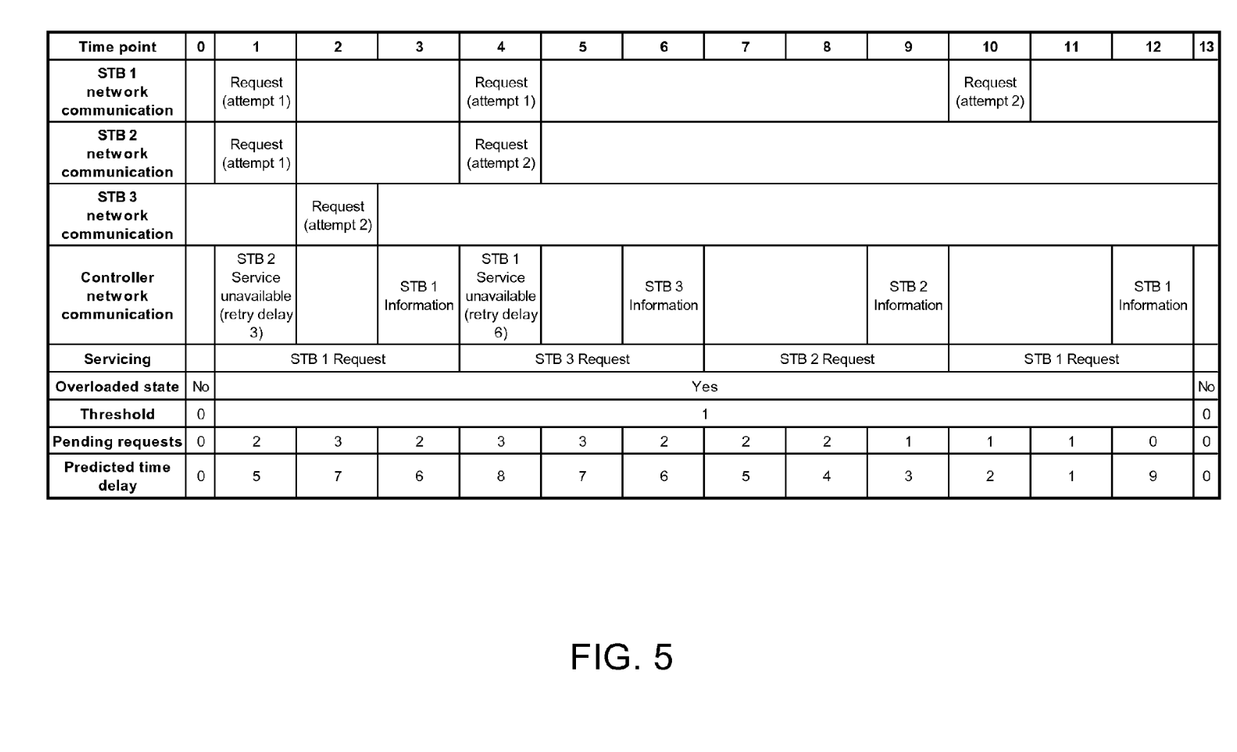
FIG. 5 illustrates a second exemplary timeline diagram for the simplified media system of FIG. 3 where STBs make requests at substantially the same time.

To better illustrate aspects of the present invention, simplified examples of operations of a media system 300 having the server 102 are shown in FIG. 3, FIG. 4, and FIG. 5. The examples shown are simplified in that the media system 300 only includes three clients (i.e, STBs 302, 304, 306); and the server 102 is assumed to only be able to service a single request at a time and is determined to be overloaded when it is servicing a request. Each request is also assumed to take the server 102 three seconds of time to service. Additionally, the threshold 117 utilized by the servicing module 117 is dynamically set to be a value of "1" when the server 102 is overloaded (i.e., currently servicing a request) and to be set to a value of "0" when the server 102 is idle (i.e., not servicing a request). It should be noted that these constraints are artificially low in order to facilitate an easier understanding of certain aspects of the present invention. In actual practice, however, the server 102 may be utilized in conjunction with any number and types of client devices, may be capable of simultaneously servicing hundreds or thousands of requests before being determined to have entered an overloaded state, may have a threshold 117 set to a value higher than "1", and may take a different amount of time to service each request according to various factors such type of request, processor 114 load, database 130 load, etc.

FIG. 3 illustrates a simplified hotel media system 300 having three STBs 302, 304, 306 that have all been rebooted at substantially the same time. In this example, requests for configuration information are received at the server 102 at substantially the same time. Such a situation could occur, for example, after an unexpected power outage at the hotel. Because, in this example, the server 102 is deemed to be overloaded upon beginning to service the first request 320, the server 102 refuses the connection with the second STB 304 by sending a service unavailable message having a retry-after delay of three seconds. In this way, the second request 322 is scheduled to be retried when the server 102 has finished processing the first request 320. Likewise, the server 102 refuses the connection with the third STB 306 by sending a service unavailable message having a retry-after delay of six seconds. In this way, the third request 324 is scheduled to be retried by the third STB 306 when the server 102 has finished processing both the first and second requests 320, 322. The pending requests log 132 may be utilized by the delay time prediction module 122 to keep track of how many pending requests exist and how long each request is estimated to require for completion in order to predict the retry-after delay required to allow the server 102 to exit the overloaded state.

Because the server 102 has scheduled the subsequent retries to occur when the server 102 predicts it will no longer be overloaded, the servicing time is known to be three seconds, and because the threshold 117 of maximum request attempts is "1" in this example, the STBs 302, 304, 306 are able to accurately report a message such as "Your media experience is scheduled to begin in XX seconds" to a user. This enhances user satisfaction because the delay at each STB 302, 304, 306 is both known and minimized given actual server 102 usage. In other configurations, a message indicating the upper-bound of the maximum delay (D) determined by formula 1 could be displayed such as "Your media experienced is scheduled to begin in at most XX seconds." In both cases, the on-screen time delay may count down in real time.

FIG. 4 illustrates a first exemplary timeline diagram for the simplified media system 300 having STBs that make requests at substantially the same time. As shown in FIG. 4, at time point 0, there are no requests currently being serviced; therefore, the server 102 is not in the overloaded state, and the threshold 117 is dynamically set to a value of "0". Additionally, since there are no current requests being serviced or prior requests from other set-top boxes that have not yet been serviced, the pending requests are "0" and the predicted time delay to exit the overloaded state is also "0".

At time point 1, two incoming requests are received at substantially the same time. Both requests have a number of attempts being equal to "1" since they are first attempts. The server 102 accepts the connection with the first STB 302 and begins to process the request from the first STB 302. Due to the above defined constraints in this example, the server 102 now determines itself to be in the overloaded state and therefore refuses the connection and sends a service unavailable message to the second STB 304. Included in the service unavailable message is a retry-after delay of "3" as determined according to the predicted amount of time the server 102 will take in order to finish servicing the request from the first STB 302. At the end of time point 1, the pending requests value is "2" since both the first and second STBs 302, 304 have made requests that have not yet been serviced. Additionally, the predicted time delay is "5" since there are still two time units (i.e., seconds in this example) left to service the request from the first STB 302 and three time units for the scheduled request for STB 304.

At time point 2, a request having a number of attempts of "1" is received from the third STB 306. Since the server 102 is servicing the request from the first STB 302, the server 102 is still deemed as being overloaded and therefore refuses the connection because the number of attempts of the incoming request ("1") is not greater than the threshold 117 of "1". The server 102 sends a service unavailable message to the third STB 306 and includes in the service unavailable message a retry-after delay of "5" as determined according to the predicted amount of time the server 102 will take in order to finish servicing both the request from the first STB 302 and the prior request from the second STB 304 that has not yet been serviced and that was scheduled by the servicing module 116 to be retried after the request from the first STB 302 is finished being serviced. At the end of time point 2, the pending requests value is "3" since all three STBs 302, 304, 306 have made requests that have not yet been serviced. Additionally, the predicted time delay is "7" since there is still one time unit remaining to service the current request from the first STB 302 and then the two scheduled requests from STB 304, 306 will each take three time units to be serviced.

At the end of time point 3, the server 102 has finished servicing the request from the first STB 302 and sends the requested information to the first STB 302. The pending requests is decreased to a value of "2" since there are now only two prior requests that have not been serviced, and the predicted time delay is decreased to a value of "6" since one time unit has passed and no new requests were scheduled. In one configuration, the server 102 may now be deemed to no longer be operating in the overloaded state until a next request is received; however, in this example the overloaded state is shown maintained because a prior request has been scheduled to be received at the very next time point.

At time point 4, two more incoming requests are received. Because the request from the second STB 304 has a number of attempts being equal to "2" (i.e., greater than the threshold 117 of "1"), the server 102 gives this request priority, accepts the connection with the second STB 304, and begins servicing this request. Because the server 102 is operating in the overloaded state and the request from the first STB 302 does not have a number of retries being greater than the threshold 117 of "1", the server 102 refuses the connection with the first STB 302 by sending a service unavailable message. Included in the service unavailable message is a retry-after delay of "6" as determined according to the predicted amount of time the server 102 will take in order to finish servicing both the currently being serviced request from the second STB 304 and the prior request from the third STB 306 that has not yet been serviced. At the end of time point 4, the pending requests value is again "3" since all three STBs 302, 304, 306 have made requests that have not yet been serviced. Additionally, the predicted time delay is "8" since there are still two time units remaining to service the current request from the second STB 304 and then the two scheduled requests from STB 306, 302 will each take three time units to be serviced.

At the end of time point 5, the predicted time delay is decreased to a value of "7" since one time unit has passed and no new requests were scheduled.

At the end of time point 6, the server 102 has finished servicing the request from the second STB 304 and sends the requested information to the second STB 304. The pending requests is decreased to a value of "2" since there are now only two prior requests that have not been serviced, and the predicted time delay is decreased to a value of "6" since one time unit has passed and no new requests were scheduled.

At time point 7, the second attempt of the request by the third STB 306 is received and the server 102 accepts the connection and begins servicing the request. The predicted time delay is decreased to a value of "5" since one time unit has passed and no new requests were scheduled. Note that the second request from the third STB 306 does not count as a newly scheduled request since this request was already pending and the second attempt is now arriving at a time point as scheduled.

At the end of time point 8, the predicted time delay is decreased to a value of "4" since one time unit has passed and no new requests were scheduled.

At the end of time point 9, the server 102 has finished servicing the request from the third STB 306 and sends the requested information to the third STB 306. The pending requests is decreased to a value of "1" since there is now only one prior request that has not been serviced, and the predicted time delay is decreased to a value of "3" because only one request remains to be serviced.

At time point 10, the second attempt of the request by the first STB 306 is received and the server 102 accepts the connection and begins servicing the request. The predicted time delay is decreased to a value of "2" since only two time units are left to be serviced in the current request and no other requests are scheduled.

At the end of time point 11, the predicted time delay is decreased to a value of "1" since only one time unit is required to service the current request and no other request are scheduled.

At the end of time point 12, the server 102 has finished servicing the request from the first STB 302 and sends the requested information to the first STB 302. The pending requests is decreased to a value of "0" since there are no other requests pending, and the predicted time delay is also set to "0" since the server 102 is entering the idle state.

At time point 13, similar to time point 0, the server 102 is idle and ready to begin immediately servicing any incoming request.

FIG. 5 illustrates a second exemplary timeline diagram for the simplified media system 300 having STBs that make requests at substantially the same time. FIG. 5 is very similar to FIG. 4, except in FIG. 5, the request made by the third STB 306 at time point 2 has a number of attempts of "2", which is higher than the exemplary threshold 117 value of "1". The number of attempts of "2" could have been caused for any number of reasons including that the server 102 was unable to service the first attempt (not shown in FIG. 5) because it did not receive the first attempt due to a network 106 problem.

Because the request has a number of attempts greater than the threshold 117, unlike that shown in FIG. 4, in FIG. 5 the server 102 does not refuse the connection to the third STB 306 at time point 2. Instead the server 102 holds the connection in an open state while it finishes processing the current request. At time point 4, the server 102 then begins processing the request made by the third STB 306. This action slightly delays the servicing of the request made by the second STB 304, but because the number of attempts for the request by the second STB 304 is also greater than the threshold 117, the server 102 holds the connection with the second STB 304 open. At the end of time point 6, the server 102 sends the requested information to the third STB 306, and at the end of time point 9, the server 102 sends the requested information to the second STB 304.

In this configuration, when a high priority request (defined as having a number of attempts greater than the threshold 117) arrives while the server 102 is already in an overloaded state, the connection to the STBs making the high priority request is accepted and held open while the server 102 services accepted requests in a first-come-first-serve basis. In another configuration, the server 102 may suspend (or cancel) servicing an accepted request that is not high priority in order to immediately begin servicing a high priority request. For example, at time point 2, the server 102 could suspend servicing the request from the first STB 302 and immediately being servicing the high priority request from the third STB 306. Regardless of the servicing order of the high priority requests, because the server 102 continues to schedule requests having number of attempts less than or equal to the threshold (i.e., first requests in this example) from other STBs to be retried after a delay sufficient for the server 102 to exit the overloaded state, the server 102 maximizes its utilization, avoids building the congestion, and maintains at least a minimum level of service to all client devices.

Figure 6:
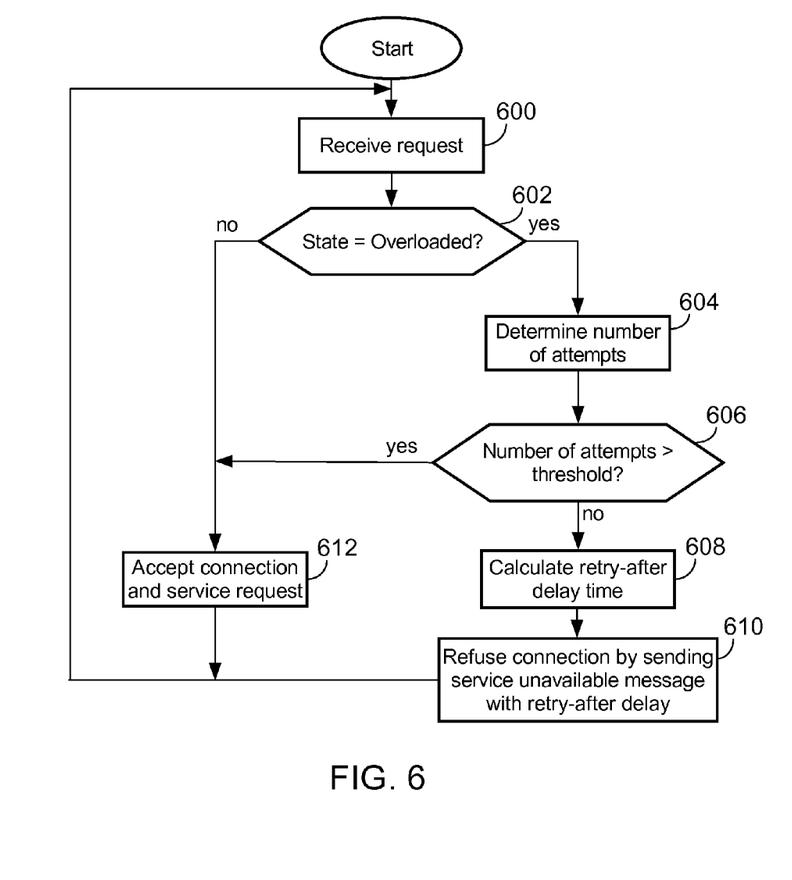
FIG. 6 is a flowchart describing operations performed by the server of FIG. 1 when servicing requests for information according to a predetermined threshold representing the maximum number of acceptable attempts per request.

FIG. 6 is a flowchart describing operations performed by the server 102 when servicing requests for information according to a predetermined threshold 117 representing the maximum number of acceptable attempts per request. The steps of the flowchart are not restricted to the exact order shown, and, in other configurations, shown steps may be omitted or other intermediate steps added. In this configuration, the server 102 performs the following operations:

Step 600: A request for information is received from a STB 104 by the server 102.

Step 602: The server 102 determines whether or not the server 102 is operating in an overloaded state. This may involve checking if the communication module 112 has exceeded or is approaching a maximum number of concurrent TCP connections on the network, a maximum CPU/processor 114 usage, a maximum network capacity, a maximum disk throughput, a maximum number of concurrent database connections, or other maximum processing ability of the server 102. If the server 102 is not determined to be operating in an overloaded state, control proceeds to step 612; otherwise, if the server 102 is overloaded, control proceeds to step 604.

Step 604: The request number module 118 determines a number of attempts for the request received at step 600. For example, in once configuration, each STB 104 will count the attempts using counter 108 and include the current attempt count in a header of the connection attempt. In another configuration, the server 102 stores counters 128 in its memory device 124 for counting the number of attempts for requests by each STB 104.

Step 606: The number of attempts determined for the request is compared with a threshold 117 representing the maximum number of connection attempts that could go denied by the server 102 due to being overloaded. In one configuration, the threshold 117 may be a fixed predetermined value. If the number of attempts is not greater than the threshold 117, control proceeds to step 608; otherwise, control proceeds to step 612.

Step 608: A retry-after delay is calculated according to a predicted time for the server 102 to exit the overloaded state. The retry-after delay takes into account pending requests including both requests being currently serviced by the server 102 and requests that are already scheduled to be serviced in the future. Calculating the retry-after delay may involve calculating how much time the server 102 will require based on a historical average rate of completing requests, how many requests are currently pending or being processed, how many requests have been recently denied, or any combination of these. Another method is to assign delays in a manner that will result in the retries by various STBs 104 being scheduled into individual timeslots in the future. For example, if three STBs make requests at substantially the same time and the server 102 is too busy to process any of the requests, the server 102 could give the first STB a delay of 1 second, the second a delay of 2 seconds, and the third a delay of 3 seconds. Predictive scheduling can also be utilized to estimate future loads and schedule STBs accordingly. For example, in a hotel that has 2000 STBs installed and the server 102 detects that a large number are requesting data at the same time, the server 102 may schedule longer delays for STBs it is unable to service than if the hotel only had 500 STBs installed. The reason is the server 102 can predict its future load level according to the number of incoming requests, the type of requests, the total number of STBs, etc. It is also possible to simply assign a random or fixed delay according to how many total STB are currently installed in the hotel. For instance, if there are 100 STBs and each request typically takes 100 ms to process then the average delay could be fixed at 10 seconds or chosen as a random delay up to 10 seconds.

Step 610: The connection with the requesting STB 104 is refused by the communication module 112 sending a service unavailable message specifying the retry-after delay to the STB 104.

Step 612: The connection with the requesting STB 104 is accepted and the server 102 begins servicing the request according to a job priority order. The job priority order may be first come first serve, or may be based upon how many times each request has been attempted, where requests having a higher number of attempts are serviced before requests having a lower number of attempts.

Figure 7:
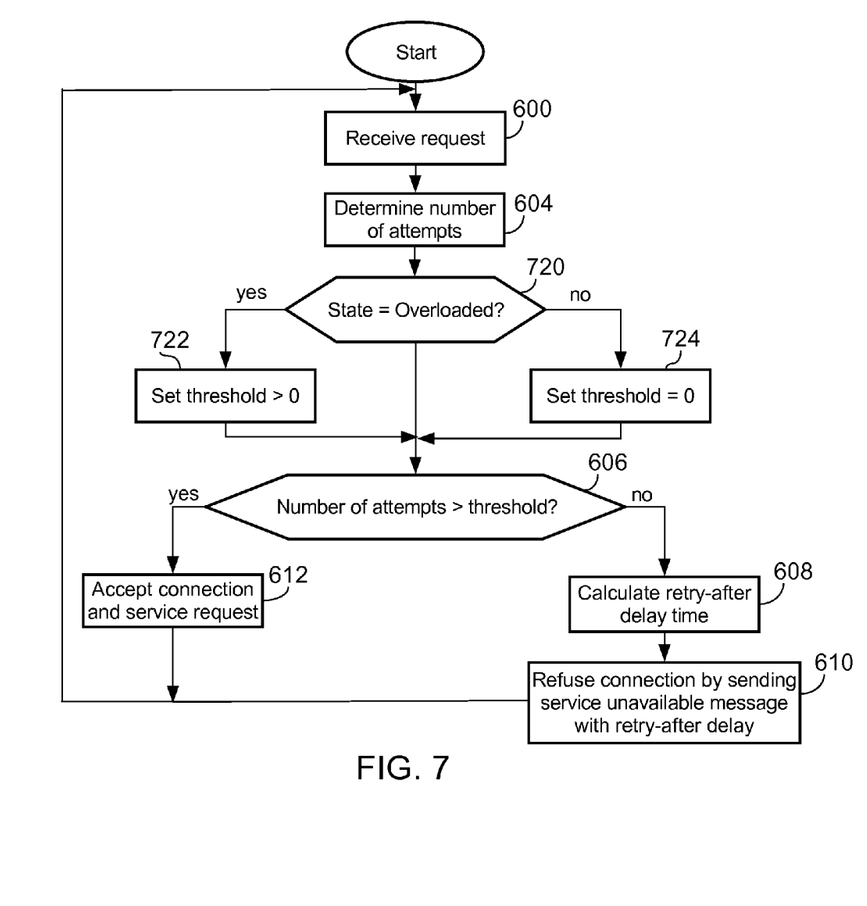
FIG. 7 is a flowchart describing operations performed by the server of FIG. 1 when servicing requests for information according to a dynamic threshold representing the maximum number of acceptable attempts per request.

FIG. 7 is a flowchart describing operations performed by the server 102 when servicing requests for information according to a dynamic threshold 117 representing the maximum number of acceptable attempts per request. Again, the steps of the flowchart are not restricted to the exact order shown, and, in other configurations, shown steps may be omitted or other intermediate steps added. In this configuration, the server 102 performs similar steps to that of FIG. 6; however, in FIG. 7, the threshold 117 is dynamically set in steps 720 to 724. In particular, in FIG. 7, the server 102 additionally performs the following steps:

Step 720: The server 102 determines whether or not the server 102 is operating in an overloaded state. This determination may be done in a way similar to that described above for step 602. If the server 102 is determined to be operating in the overloaded state, control proceeds to step 722; otherwise, if the server 102 is not operating in the overloaded state, control proceeds to step 724.

Step 722: Because the server 102 is overloaded, the threshold 117 is dynamically set by the threshold setting module 120 to a value greater than zero. The exact value may be predetermined or automatically determined according to formula 1 described above, for example.

Step 724: Because the server 102 is not overloaded, the threshold 117 is dynamically set by the threshold setting module 120 to a value of zero. This means that the first request attempt from a STB 104 will already have a number of attempts being greater than the threshold 117. Therefore, the server 102 will immediately accept all request connections and begin servicing the requests when it is not overloaded.

By giving higher priority service to STBs 104 that have been kept waiting past a certain number of retries, the server 102 maintains a better overall quality level. This is particularly useful in a hotel media system 100 when thousands of STBs 104 attempt to simultaneously load dynamic UI code and application software 110 upon boot-up or reset. According to one aspect of the invention, the server 102 indicates retry delays to STBs 104 in hotel rooms to avoid network congestion and avoid increasing server 102 overload, but will maintain a minimum level of overall service by giving priority to STBs 104 that have already made many request attempts (i.e, more than a threshold 117).

Although the invention has been described in connection with a preferred embodiment, it should be understood that various modifications, additions and alterations may be made to the invention by one skilled in the art without departing from the spirit and scope of the invention. For example, although the description of the invention has involved a hotel media system server 102 servicing requests from set-top boxes 104, the present invention is equally applicable to any hospitality related location or service wishing to provide any client devices with information from a server. Examples of hospitality locations include but are not limited to hotels, motels, resorts, hospitals, apartment/townhouse complexes, restaurants, retirement centres, cruise ships, busses, airlines, shopping centres, passenger trains, etc. Examples of client devices include set-top boxes, mobile phones, laptop computers, notebook computers, desktop computers, tablet computers, in-room control devices such lighting and heating devices, personal digital assistants (PDAs), digital still and video cameras, and any other device that may be utilized to request information from a server. Similarly, the present invention is also useful outside the hospitality industry for use to avoid overloading a server by a plurality of clients.

In summary, a method of servicing requests for information at a server includes receiving a request for information from a client device, and determining a number of attempts of the request made by the client device. Both the client device and the server may count the number of attempts for each request. When the number of attempts is greater than a threshold, the method includes servicing the request and sending the information to the client device. When the number of attempts is not greater than the threshold, the method includes sending a service unavailable message to the client device. A retry-after delay may be calculated by the server according to a predicted time for the server to exit the overloaded state and included in the service unavailable message. The predicted time may take into account both requests currently being serviced and requests that have been scheduled to be serviced in the future.

The various separate configurations, elements, features, and modules of the invention described above may be integrated or combined into single units. For example, a high definition television or other media platform can be used instead of (or in addition to) a stand-alone set-top box. In another example, the various modules 112, 116, 118, 120, 122 and other components 130, 114, 124 of the media system server 102 shown in FIG. 1 may be located in different physical units. Similarly, functions of single units may be separated into multiple units. Unless otherwise specified, features and modules described may be implemented in hardware or software according to different design requirements. Additionally, all combinations and permutations of the above described features and configurations may be utilized in conjunction with the invention.

What is claimed is:

1. A hospitality media system comprising:
a media system server coupled to a computer network; and
a set-top box coupled to the computer network;
wherein the set-top box is for providing a media experience in a guest room of a hospitality establishment, and the set-top box establishes a connection with the media system server over the computer network and sends a request for information to the media system server via the connection, the requested information to be utilized by the set-top box when providing the media experience;
in response to receiving the request at least when the media system server is in a particular operating state, the media system server determines a number of attempts of the request that have been made by the set-top box;
when the number of attempts is greater than a threshold, the media system server holds the connection in an open state while servicing the request and provides the set-top box with the requested information via the connection; and
when the number of attempts is not greater than the threshold, the media system server sends a service unavailable response to the set-top box via the connection and then closes the connection.

2. The hospitality media system of claim 1, wherein:
the connection is a transmission control protocol (TCP) connection;
the request is a hypertext transfer protocol (HTTP) request; and
the service unavailable response is a hypertext transfer protocol (HTTP) response having response code 503.

3. The hospitality media system of claim 1, wherein the media system server includes in the service unavailable response a retry-after delay calculated to schedule the set-top box to retry the request after at least one other request is scheduled to be retried by another set-top box.

4. The hospitality media system of claim 1, wherein:
the particular operating state is an overloaded operating state; and
the media system server determines itself to be operating in the overloaded operating state at least according to a number of currently open network connections.

5. The hospitality media system of claim 1, wherein the requested information is a custom application program for execution by the set-top box in order to provide the media experience.

6. The hospitality media system of claim 5, wherein the custom application program is for execution within a web browser environment on the set-top box.

7. The hospitality media system of claim 1, wherein the requested information is configuration information for use by the set-top box while providing the media experience.

8. The hospitality media system of claim 1, wherein:
the set-top box counts the number of attempts of the request and includes a request attempt count in a header of the request sent to the media system server; and
the media system server determines the number of attempts of the request that have been made by the set-top box by reading the request attempt count.

9. The hospitality media system of claim 1, wherein the media system server increments a request attempt counter in a memory device when the number of attempts is not greater than the threshold, the request attempt counter indicating the number of attempts of the information request.

10. The hospitality media system of claim 1, wherein the media system server changes an internal job order to give priority to servicing the request when the number of attempts is greater than the threshold.

11. A computer server comprising:
a communication module coupled to a computer network for establishing a connection over the computer network with a set-top box in a guest room of a hospitality establishment; and
a processor coupled to the communication module and configured to:

receive a request for information from the set-top via the connection, the requested information to be utilized by the set-top box to provide a media experience in the guest room;

determine an operating state of the computer server;

when the computer server is in at least a particular operating state, determine a number of attempts of the request that have been made by the set-top box;

when the number of attempts is greater than a threshold, hold the connection in an open state while servicing the request and provide the set-top box with the requested information via the connection; and when the number of attempts is not greater than the threshold, send a service unavailable response to the set-top box via the connection and then close the connection.

12. The computer server of claim 11, wherein:

the connection is a transmission control protocol (TCP) connection;

the request is a hypertext transfer protocol (HTTP) request; and the service unavailable response is a hypertext transfer protocol (HTTP) response having response code 503.

13. The computer server of claim 11, wherein the processor is configured to determine the number of attempts of the request that have been made by the set-top box by reading a request attempt count included by the set-top box in a header of the request.

14. The computer server of claim 11, wherein the processor is further configured to calculate a retry-after delay and to include the retry-after delay in the service unavailable response; wherein the retry-after delay is calculated to schedule the set-top box to retry the request after at least one other request is scheduled to be retried by another set-top box.

15. The computer server of claim 11, wherein the processor is further configured to change an internal job order to give priority to servicing the request when the number of attempts is greater than the threshold.

16. A method of providing a media experience within a guest room of a hospitality establishment, the method comprising:

configuring a set-top box in the guest room to establish a connection with a media system server via a computer network and to send a request for information to the media system server via the connection, the requested information to be utilized by the set-top box when providing the media experience; and configuring the media system server when operating in at least one state to determine a number of attempts of the request that have been made by the set-top box; and, when the number of attempts is greater than a threshold, to hold the connection in an open state while servicing the request and provide the set-top box with the requested information via the connection; and, when the number of attempts is not greater than the threshold, to send a service unavailable response to the set-top box via the connection and then close the connection.

17. The method of claim 16, further comprising configuring the set-top box to automatically request the information during boot-up.

18. The method of claim 16, wherein the requested information is one or more of a custom application program for execution by the set-top box in order to provide the media experience and configuration information for use by the set-top box while providing the media experience.

19. The method of claim 16, further comprising configuring the media system server to calculate a retry-after delay and to include the retry-after delay in the service unavailable response; wherein the retry-after delay is calculated to schedule the set-top box to retry the request after at least one other request is scheduled to be retried by another set-top box.

20. The method of claim 16, further comprising configuring the media system server to change an internal job order to give priority to servicing the request when the number of attempts is greater than the threshold.

* * * * *